US011286809B2

(12) United States Patent
Lewis et al.

(10) Patent No.: US 11,286,809 B2
(45) Date of Patent: Mar. 29, 2022

(54) AIRFOIL PLATFORM COOLING CHANNELS

(71) Applicant: United Technologies Corporation, Farmington, CT (US)

(72) Inventors: Scott D Lewis, Vernon, CT (US); Kyle C Lana, Portland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 665 days.

(21) Appl. No.: 15/496,977

(22) Filed: Apr. 25, 2017

(65) Prior Publication Data

US 2018/0306058 A1 Oct. 25, 2018

(51) Int. Cl.
| | |
|---|---|
| *F01D 25/12* | (2006.01) |
| *F01D 5/30* | (2006.01) |
| *F01D 11/00* | (2006.01) |
| *F01D 5/18* | (2006.01) |
| *F01D 11/04* | (2006.01) |
| *F01D 5/08* | (2006.01) |

(52) U.S. Cl.
CPC ............ *F01D 25/12* (2013.01); *F01D 5/187* (2013.01); *F01D 5/3007* (2013.01); *F01D 11/006* (2013.01); *F01D 11/04* (2013.01); *F01D 5/082* (2013.01); *F05D 2220/32* (2013.01); *F05D 2240/81* (2013.01); *F05D 2250/314* (2013.01); *F05D 2260/202* (2013.01)

(58) Field of Classification Search
CPC .......... F01D 5/081; F01D 5/082; F01D 5/087; F01D 5/143; F01D 5/145; F01D 5/18; F01D 5/181; F01D 5/187; F01D 5/3007; F01D 11/006; F01D 11/04; F01D 25/08; F01D 25/12; F05D 2220/32; F05D 2240/80; F05D 2240/81; F05D 2250/314; F05D 2260/202
See application file for complete search history.

(56) References Cited

U.S. PATENT DOCUMENTS 5,122,033 A * 6/1992 Paul ......................... F01D 5/18
416/96 R
6,210,111 B1  4/2001 Liang
(Continued)

FOREIGN PATENT DOCUMENTS

| EP | 1013880 | 6/2000 |
| EP | 1528224 | 5/2005 |

(Continued)

OTHER PUBLICATIONS

European Patent Office, European Search Report dated Nov. 27, 2018 in Application No. 18169064.5.
(Continued)

*Primary Examiner* — Dominick L Plakkoottam
*Assistant Examiner* — Charles W Nichols
(74) *Attorney, Agent, or Firm* — Snell & Wilmer L.L.P.

(57) ABSTRACT

An airfoil may include an airfoil body, a root and a platform disposed between the airfoil body and the root. The platform may have a first mating surface and a second mating surface. The platform may include a pocket defined by an inner diameter surface of the platform proximate the first mating surface. A channel may be defined in the platform with an outlet of the channel defined in the second mating surface.

18 Claims, 7 Drawing Sheets

(56) References Cited

U.S. PATENT DOCUMENTS

| | | | |
|---|---|---|---|
| 6,431,833 B2* | 8/2002 | Jones | F01D 5/08 |
| | | | 416/193 A |
| 7,600,972 B2* | 10/2009 | Benjamin | F01D 5/187 |
| | | | 29/889.21 |
| 8,511,995 B1 | 8/2013 | Liang | |
| 8,641,377 B1* | 2/2014 | Liang | F01D 5/187 |
| | | | 416/193 A |
| 2005/0100437 A1 | 5/2005 | Phillips et al. | |
| 2014/0321961 A1 | 10/2014 | Beattie et al. | |
| 2016/0017718 A1* | 1/2016 | Zhang | F01D 5/187 |
| | | | 29/889.21 |
| 2016/0305254 A1* | 10/2016 | Snyder | F01D 11/006 |

FOREIGN PATENT DOCUMENTS

| | | |
|---|---|---|
| EP | 2956627 | 12/2015 |
| WO | 2015057310 | 4/2015 |
| WO | 2015112240 | 7/2015 |

OTHER PUBLICATIONS

European Patent Office, European Office Action dated Jan. 31, 2020 in Application No. 18169064.5.
European Patent Office, European Office Action dated Aug. 21, 2020 in Application No. 18169064.5.

\* cited by examiner

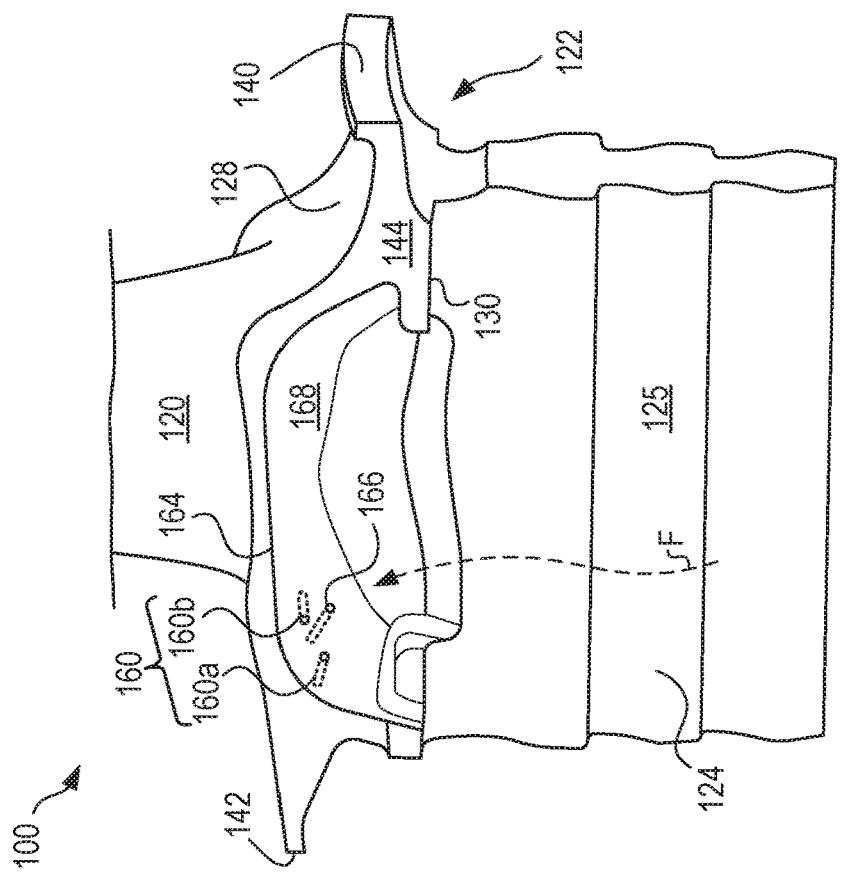

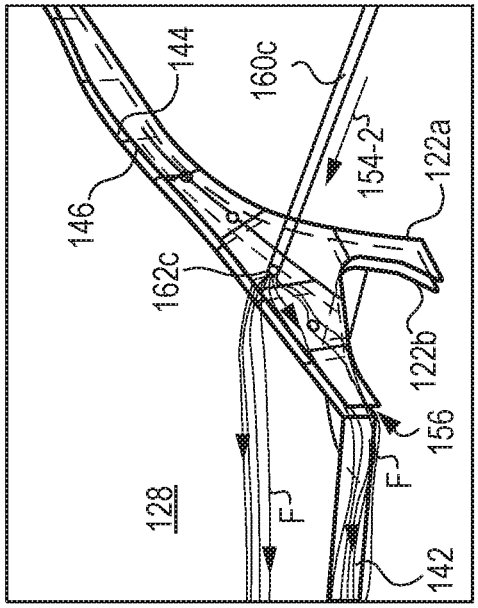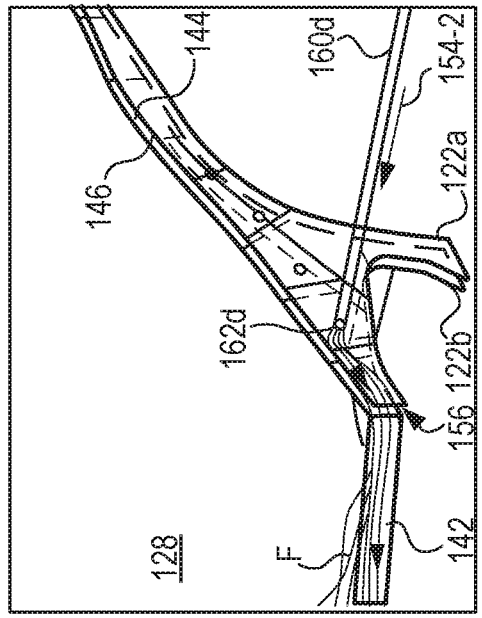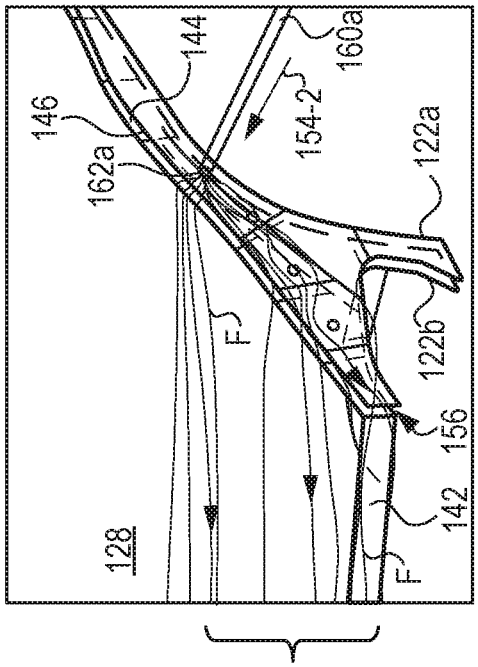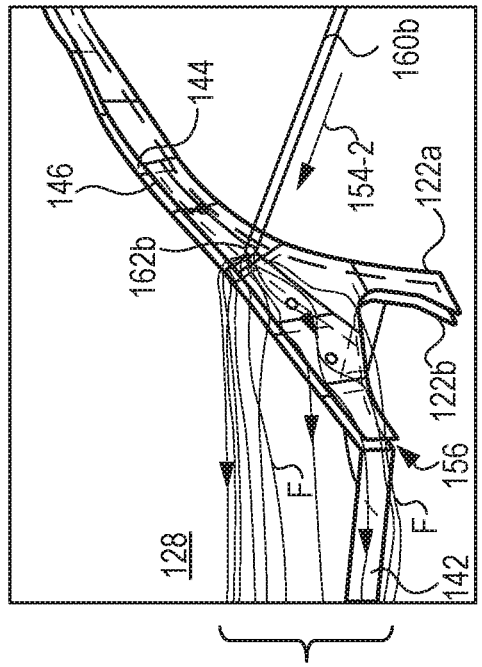

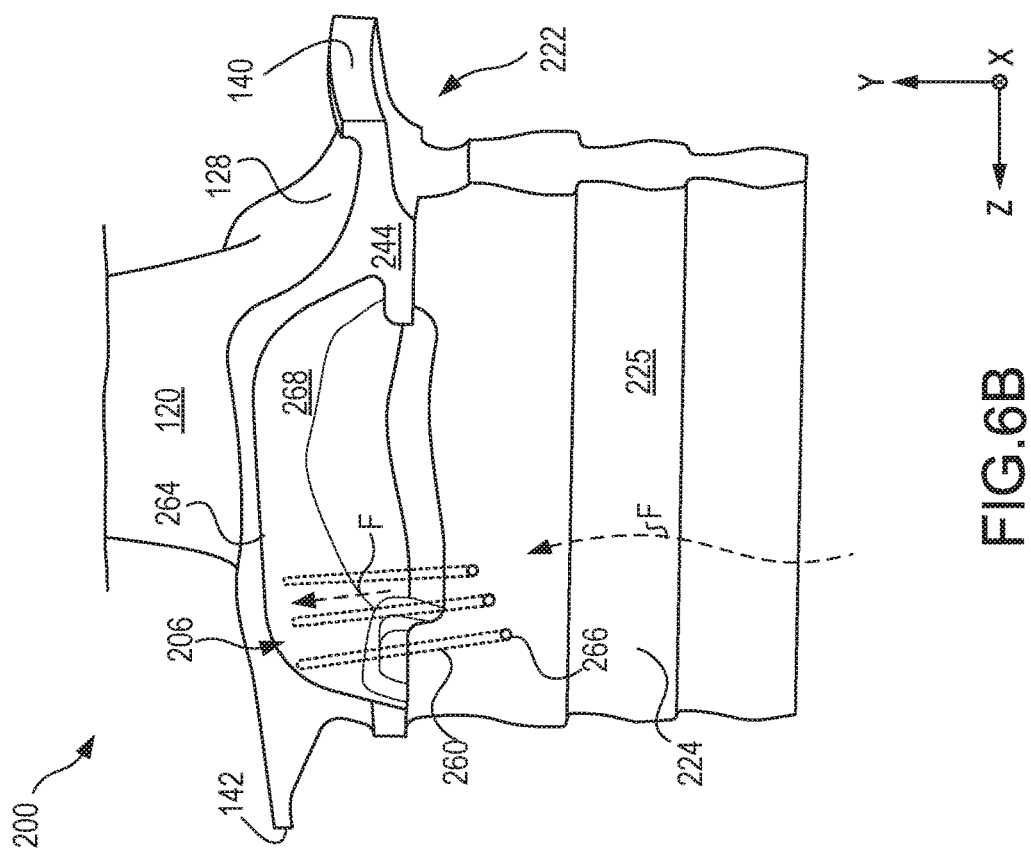
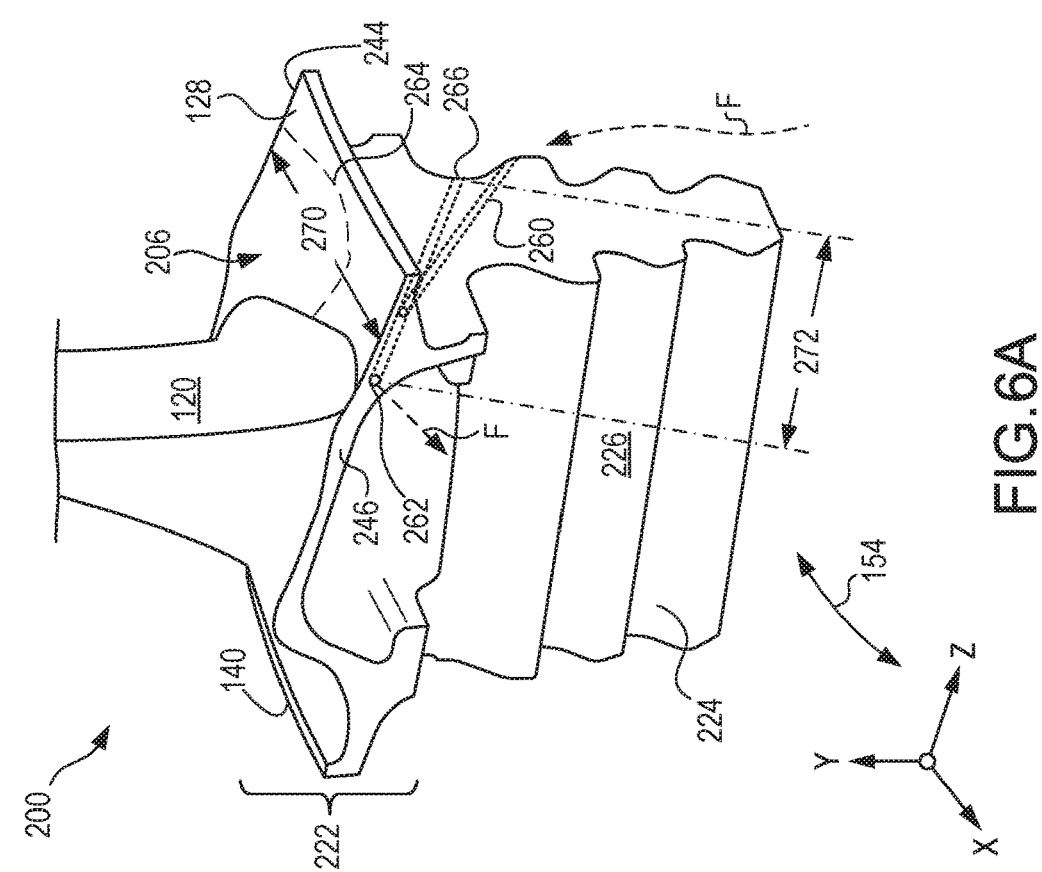
FIG. 6A
FIG. 6B

AIRFOIL PLATFORM COOLING CHANNELS

FIELD

The present disclosure relates to cooling structures for gas turbine engines, and, more specifically, to cooling systems for airfoil platforms.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines. The turbine section includes multiple stages of blades and vanes. As fluid flows through the turbine section, the flow causes the blades to rotate about an axis of rotation. The vanes, positioned between each row of blades, are used to redirect the flow in order to maximize the power received by the downstream blades.

Temperatures within the turbine section may be relatively high, as the flow of fluid is received initially from the combustor section of the gas turbine engine. Cooling air may be extracted from the compressor section and used to cool the gas path components. Cooled components may include, for example, rotating blades and stator vanes in the turbine section.

SUMMARY

A cooling system for an airfoil platform is provided. An airfoil may include an airfoil body, and a platform disposed radially inward of the airfoil body. The platform may have a first mating surface and a second mating surface. The platform may include a pocket defined by an inner diameter surface of the platform proximate the first mating surface. A first channel may be defined in the platform with an outlet of the first channel defined in the second mating surface.

In various embodiments, an inlet of the first channel may be defined in the pocket. A root may be disposed radially inward of the platform. An inlet of the first channel may defined in a first circumferential side of the root. The first channel may extend at least 50% through a chord length of the platform. The first channel may be configured to direct a cooling airflow from a first circumferential side of the airfoil, internally through the platform, and to the second mating surface of the platform at a second circumferential side of the airfoil. The second circumferential side of the airfoil may be opposite to the first circumferential side of the airfoil. A second channel may be defined in the platform with an outlet of the second channel defined in the second mating surface. The first channel may be oriented in a first direction and the second channel is oriented in a second direction. The first direction may diverge from the second direction as the first channel and the second channel approach the second mating surface. The airfoil may comprise a blade.

An airfoil assembly is also provided. The airfoil assembly may comprise a first airfoil having a first platform. The first platform may having a first mating surface and a second mating surface. The first platform may define a first channel having an outlet formed in the second mating surface. The airfoil assembly may comprise a second airfoil adjacent to the first airfoil. The second airfoil may have a second platform with a first mating surface and a second mating surface. The first channel in the first airfoil may be configured to deliver a cooling airflow to the first mating surface of the second airfoil.

In various embodiments, the first platform may include a pocket defined by an inner diameter surface of the first platform proximate the first mating surface of the first platform. An inlet of the channel may be defined in the pocket. The first channel may extend at least 50% through a chord length of the first platform. The outlet may be formed in an aft area of the second mating surface. The first channel may be further configured to deliver the cooling airflow to a platform trailing edge of the second platform.

The first airfoil may further comprise a root disposed radially inward of the first platform. An inlet of the first channel may be defined in a first circumferential side of the root proximate the first mating surface of the first airfoil. A length of the first channel may be at least 80% of a chord length of the first platform. The cooling airflow may be received by the first airfoil from an airflow path external to the root. The first platform may define a second channel having an outlet formed in the second mating surface. The first channel may be formed in a plane which is different than a plane in which the second channel is formed.

A gas turbine engine may comprise a compressor section configured to supply a cooling airflow. A turbine section may comprise a disk configured to rotate about an axis and blade coupled to the disk. The blade may comprise an airfoil body and a platform disposed radially inward of the airfoil body. The platform may have a first mating surface and a second mating surface. The platform may be configured to receive the cooling airflow proximate the first mating surface. A channel may be defined in the platform with an outlet of the channel defined in the second mating surface.

In various embodiments, the platform includes a pocket defined by an inner diameter surface of the platform proximate the first mating surface. An inlet of the channel may be defined in the pocket. The channel may extend at least 50% through a chord length of the platform. The blade may further comprise a root disposed radially inward of the platform. An inlet of the channel may be defined in a first circumferential side of the root. A length of the channel may be at least 80% of a chord length of the platform.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIGS. 3A, 3B and 3C illustrate views of perspective views of airfoils having a platform cooling system, in accordance with various embodiments;

FIGS. 5A, 5B, 5C and 5D illustrate a cutaway perspective view an airfoil assembly having a platform cooling system, in accordance with various embodiments; and FIGS. 6A and 6B illustrate perspective views of an airfoil having a platform cooling system, in accordance with various embodiments.

DETAILED DESCRIPTION

Figure 1:
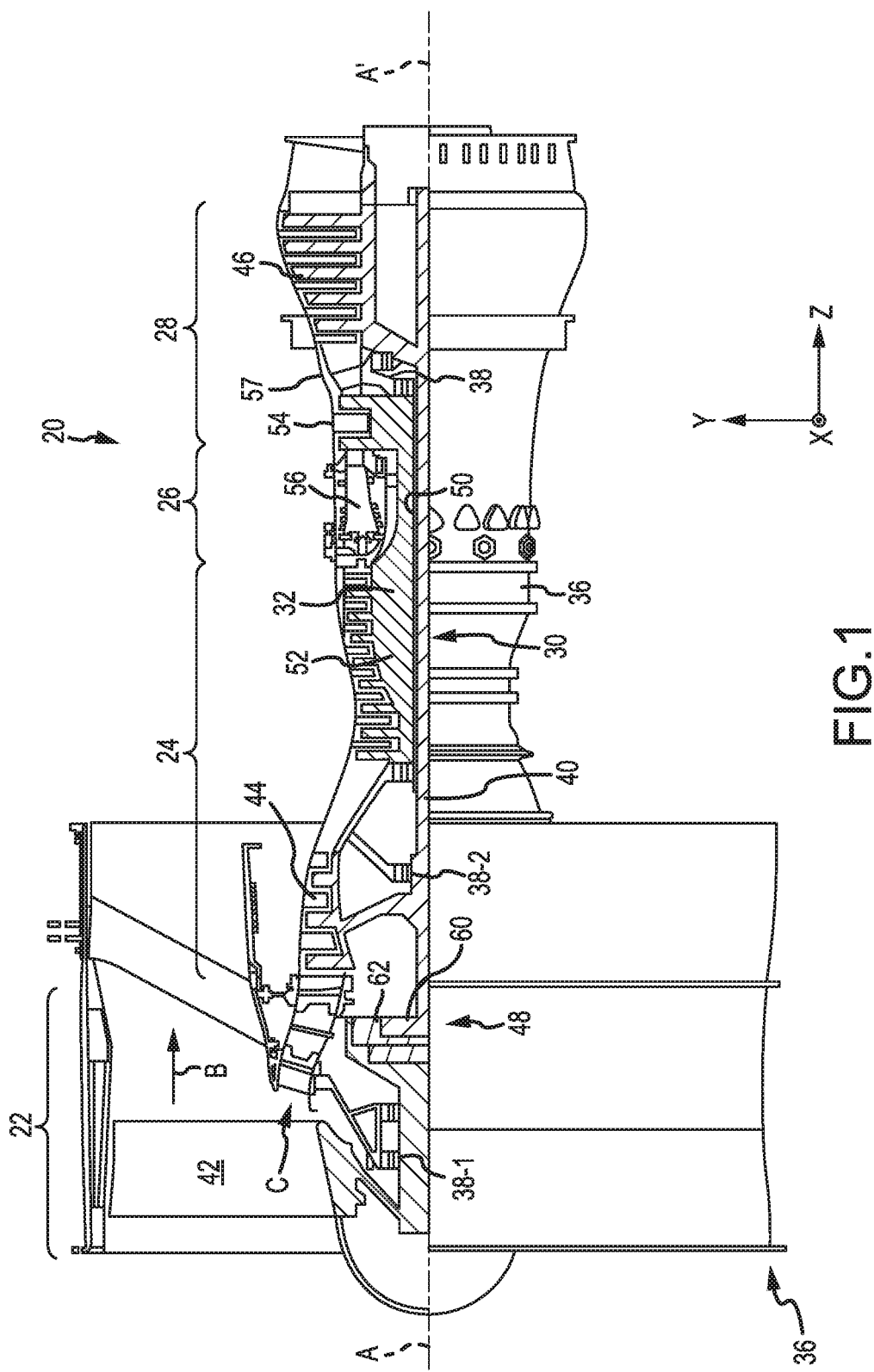
FIG. 1 illustrates a cross-sectional view of an exemplary gas turbine engine, in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Any reference related to fluidic coupling to serve as a conduit for cooling airflow and the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

Any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the exhaust (e.g., the back end) of a gas turbine engine. As used herein, "forward" refers to the direction associated with the intake (e.g., the front end) of a gas turbine engine. As used herein, "distal" refers to the direction outward, or generally, away from a reference component. As used herein, "proximal" refers to a direction inward, or generally, towards the reference component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. A first component that is "radially outward" of a second component means that the first component is positioned at a greater distance away from the engine central longitudinal axis than the second component.

The present disclosure relates to a cooling system for airfoil platforms. Various components of a gas turbine engine, including but not limited to airfoils and airfoil platforms of blades and vanes, may be subjected to repetitive thermal cycling under widely ranging temperatures and pressures. The airfoils and airfoil platforms may be subjected to relatively extreme operating conditions. This disclosure relates to gas turbine engine components having platform cooling circuits. Various embodiments enable improved heat transfer coefficients in areas of the airfoil platform exposed to hot gas path air, while using a limited pressure drop to achieve the heat transfer coefficients. In various embodiments, the cooling system may direct a cooling airflow through the airfoil platform and toward a mating surface of an adjacent airfoil platform. A plurality of cooling channels may be formed through the platform. The cooling holes may extend from a first circumferential side of the platform to a second circumferential side opposite the first circumferential side. A cooling airflow may be sourced from the first circumferential side of the platform. The cooling airflow may be directed through the cooling channels from the first circumferential side to the second circumferential side of the platform and may exit through outlets defined in a mating surface of the second circumferential side. The cooling airflow exiting the mating surface may impinge a mating surface of an adjacent airfoil platform, thereby cooling the mating surface of the adjacent platform.

With reference to FIG. 1, a gas turbine engine 20 is shown according to various embodiments. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a path of bypass airflow B while compressor section 24 can drive coolant along a path of core airflow C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided x-y-z axes. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2:
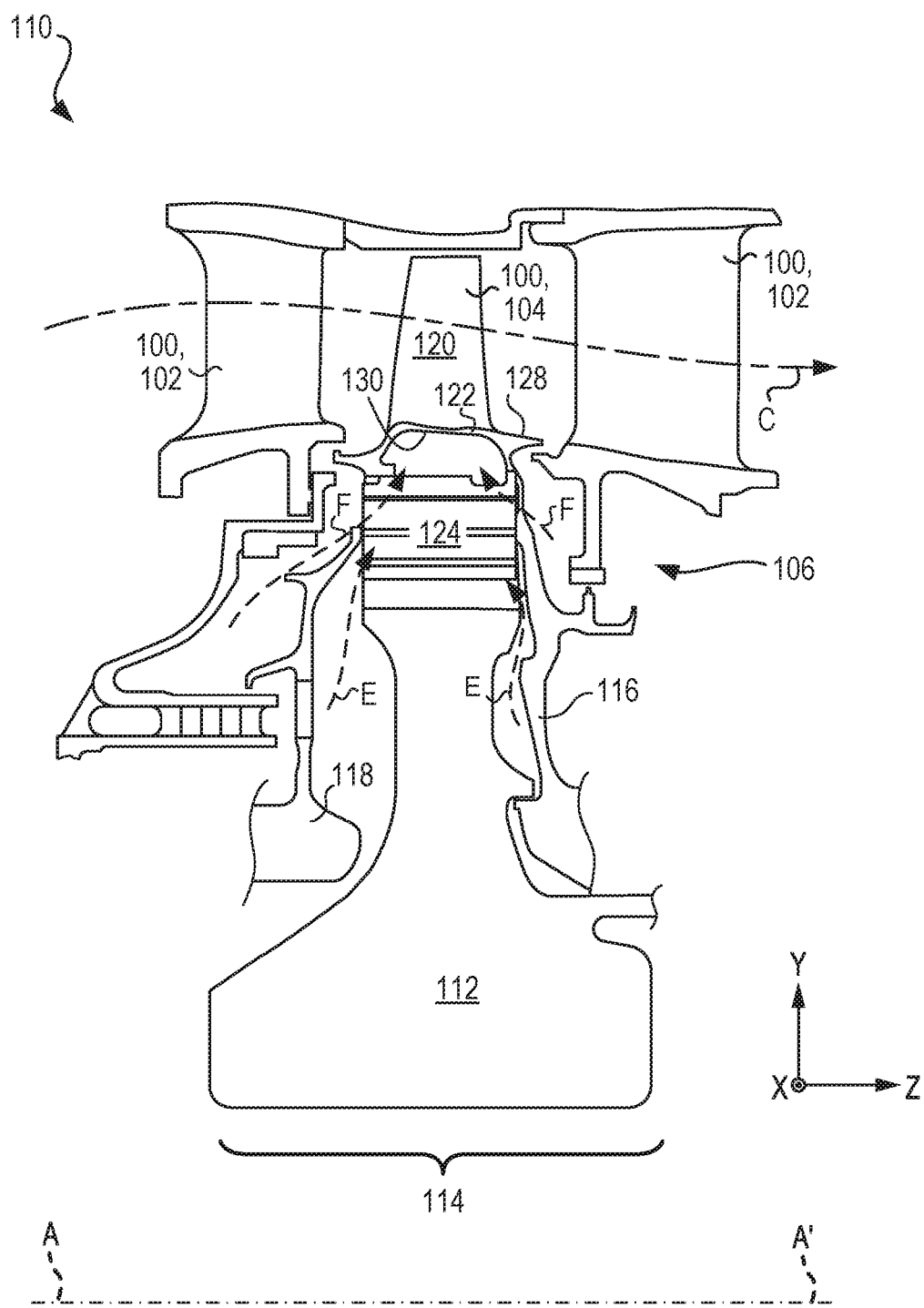
FIG. 2 illustrates an engine section including example airfoils, such as a blade and a vane of an exemplary gas turbine engine, according to various embodiments.

Referring now to FIG. 1 and to FIG. 2, according to various embodiments, each of low pressure compressor 44, high pressure compressor 52, low pressure turbine 46, and high pressure turbine 54 in gas turbine engine 20 may comprise one or more stages or sets of rotating blades and one or more stages or sets of stationary vanes axially interspersed with the associated blade stages but non-rotating about engine central longitudinal axis A-A'. Each compressor stage and turbine stage may comprise multiple interspersed stages of blades 104 and vanes 102. The blades 104 rotate about engine central longitudinal axis A-A', while the vanes 102 remain stationary with respect to engine central longitudinal axis A-A'. For example, FIG. 2 schematically shows, by example, a portion of an engine section 110, which is illustrated as a turbine section 28 of gas turbine engine 20. It will be understood that the cooling systems in the present disclosure are not limited to the turbine section, and could extend to other sections of the gas turbine engine 20, including but not limited to compressor section 24.

Engine section 110 may include alternating rows of blades 104 and vanes 102 (shown schematically) that carry airfoils that extend into the core flow path C. For example, the rotor assemblies can carry a plurality of rotating blades 104, while each vane assembly can carry a plurality of vanes 102 that extend into the core flow path C. Blades 104 create or extract energy (in the form of pressure) from the core airflow that is communicated through the gas turbine engine 20 along the core flow path C. Vanes 102 direct the core airflow to the blades 104 to either add or extract energy. Vanes 102 may be arranged circumferentially about engine central longitudinal axis A-A'. In various embodiments, a set of blades 104 may be coupled about a circumference of a generally circular disk 112, which may be disposed radially inward of core flow path C. Disk 112 with blades 104 may comprise an airfoil assembly 114 configured to rotate about engine central longitudinal axis A-A'. In various embodiments, a cover plate 116 or a minidisk 118 may be coupled to an axial surface of disk 112. For example, a cover plate 116 may be coupled to an axially forward surface of disk 112, and a minidisk 118 may be coupled to an axially aft surface of disk 112. Blades 104 and vanes 102 may generally be referred to as airfoils 100.

Each airfoil 100, illustrated as blades 104, may include an airfoil body 120, a platform 122, and a root 124. Platform 122 may be disposed at an inner diameter of the airfoil body 120 of airfoil 100. Root 124 may be disposed at an inner diameter of platform 122, such that platform 122 is disposed between airfoil body 120 and root 124. Airfoil body 120, a platform 122, and a root 124 may be integrally formed. As used herein, the term "integrated" or "integral" may include forming one, single continuous piece. In various embodiments, the airfoil body 120 extends from a radially outer surface 128 (i.e. a gas path-facing surface) of the platform 122 and the root 124 extends from a radially inner surface 130 (i.e. a non-gas path-facing surface) of the platform 122. The radially outer surface 128 of platform 122 is exposed to the hot combustion gases of the core flow path C, whereas the radially inner surface 130 is remote from the core flow path C. The root 124 is configured to attach the airfoil 100 to the disk 112 of the airfoil assembly 114, such as within a slot formed in the airfoil assembly 114.

The airfoil body 120 and platform 122 of the airfoils 100 may be subjected to relatively extreme operating conditions. A cooling system 106 for airfoils 100 may include multiple airflow paths, such as airflow paths E and F, feeding cooling air to the airfoil body 120 and/or the platform 122. Airflow paths E and F may comprise cooling airflow. The cooling airflow in airflow path E may be referred to as a primary cooling airflow, while the cooling airflow in airflow path F may be referred to as a secondary cooling airflow.

The cooling airflow airflow paths E and F may originate from any suitable source in gas turbine engine 20. For example, the airflow may comprise air received from a compressor section of gas turbine engine 20.

A primary cooling airflow may be directed along airflow path E to provide primary cooling air, for example, to airfoil body 120 of airfoil 100. Airflow path E may communicate the primary cooling airflow, such as compressor bleed airflow, through root 124 to internally cool airfoil body 120 and/or other sections of airfoil 100. Airflow path E may be directed axially through minidisk 118 and flow radially outward between minidisk 118 and disk 112. Airflow path E may also be directed radially outward between disk 112 and cover plate 116. Airflow path E may be directed into disk 112 and/or root 124 as an internal flow path. As an internal flow path, airflow path E may extend through at least a portion of the root 124 and into airfoil body 120. The primary cooling airflow may be at a higher pressure than surrounding areas within engine section 110, creating a tendency for primary cooling airflow to leak into areas around airflow path E.

Cooling airflow which escapes airflow path E, i.e., a leakage airflow or purge airflow, may be captured by cooling system 106 and used by cooling system 106 as a secondary cooling airflow. Airflow path F may flow around an exterior of disk 112, minidisk 118, and cover plate 116, and root 124 of airfoil 100. Airflow path F may be defined between roots 124 of adjacent airfoils 100. Roots 124 may each have a first circumferential side 125 and a second circumferential side 126, where the second circumferential side 126 of a root 124 is opposite to the first circumferential side 125. Roots 124, such as first root 124a and second root 124b, of adjacent airfoils 100 may define airflow path F. More specifically, a portion of airflow path F may be defined between a first circumferential side 125 of a second root 124b and a second circumferential side 126 of a first root 124a. Thus, the cooling airflow received by airfoil 100 from airflow path F may be external to the root 124. The secondary cooling airflow may be directed along airflow path F to provide a secondary cooling air, for example, to the platform 122 of airfoil 100. The secondary cooling airflow of airflow path F may be referred to as a "poor man" airflow.

Airflow path F may flow into platform 122 through the radially inner surface 130 of platform 122. Airflow path E within root 124 and airfoil body 120 may be fluidly isolated from airflow path F within platform 122.

Figure 3A:
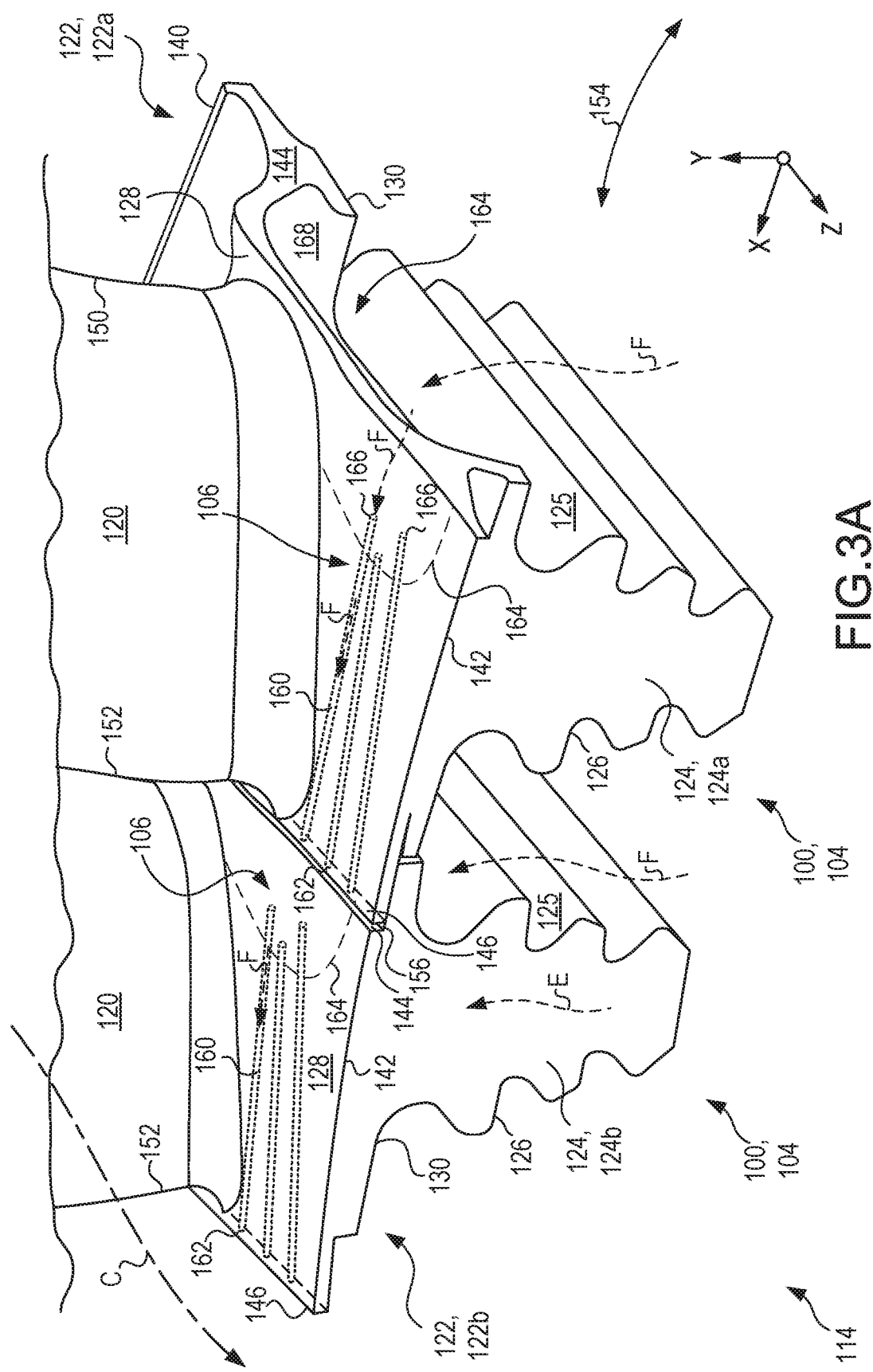

With reference to FIGS. 3A, 3B and 3C, a portion of an airfoil assembly 114 having airfoils 100 is shown, in accordance with various embodiments. In FIG. 3A, two adjacent airfoils 100 are shown with each airfoil having an airfoil body 120 coupled to a platform 122. Platforms 122 are positioned radially inward of airfoil bodies 120. As such, platforms 122 may be inner diameter platforms of airfoil bodies 120. The roots 124 are positioned radially inward of platforms 122, such that a platform 122 is disposed between an airfoil body 120 and a root 124. Platforms 122 are positioned circumferentially adjacent each other, such that a first platform 122a is positioned circumferentially adjacent a second platform 122b. A plurality of platforms 122 may be positioned circumferentially adjacent such that the plurality of platforms 122 encircles the axis of rotation, i.e, engine central longitudinal axis A-A', of gas turbine engine 20 (see FIGS. 1 and 2). The plurality of platforms 122 may together form an annular segmented platform, such that each of platforms 122 is considered a platform segment of the annular segmented platform. Features and advantages described herein are directed to inner diameter platforms, however, the same features and advantages may be implemented and recognized with respect to outer diameter and other platforms. Further, FIG. 3A schematically shows, by example, a portion of an airfoil assembly 114, which is illustrated having a plurality of blades 104. It will be understood that the cooling systems in the present disclosure are not limited to blades, and could extend to vanes and vane platforms of the gas turbine engine 20.

A platform 122 of an airfoil 100 axially extends between a platform leading edge 140 and a platform trailing edge 142 and circumferentially extends between a first mating surface 144 and a second mating surface 146. First mating surface 144 may be at a first circumferential side of the platform 122, and second mating surface 146 may be at a second circumferential side of the platform 122, where the second circumferential side is opposite to the first circumferential side.

The airfoil body 120 axially extends between a leading edge 150 and a trailing edge 152 and circumferentially extends between a pressure side (i.e. having a generally concave surface) and a suction side (i.e. having a generally convex surface). A first platform 122a may be circumferentially adjacent to a second platform 122b. A second mating surface 146 of first platform 122a may face a first mating surface 144 of second platform 122b. First platform 122a may contact a portion of second platform 122b. In various embodiments, a second mating surface 146 of first platform 122a may be spaced apart (i.e., in the circumferential direction 154) from the first mating surface 144 of second platform 122b and may define a gap 156 therebetween. The cooling system 106 provides cooling airflow to the platforms 122 and discourages gas from core flow path C from being ingested into gap 156.

Referring still to FIGS. 3A, 3B and 3C, airfoils 100 may include a cooling system 106 that includes one or more channels 160 (also referred to as cooling passages) and one or more outlets or cooling holes 162 formed in the platform 122 of an airfoil 100. Platform 122 may define a pocket 164 in the radially inner surface 130 of platform 122. Adjacent platforms 122, such as first platform 122a and second platform 122b, may each define a portion of a pocket 164. A first portion of pocket 164 may be defined at second mating surface 146 of first platform 122a and a second portion of pocket 164 is defined at first mating surface 144 of second platform 122b. Thus, a pocket 164 may be defined by inner diameter surface 130 of first platform 122a and second platform 122b, and more specifically by the inner diameter surface 130 of first platform 122a proximate second mating surface 146 of the first platform 122a and by the inner diameter surface 130 of second platform 122b proximate first mating surface 144 of the second platform 122b.

FIG. 3B shows a portion of a pocket 164 defined at second mating surface 146 of a platform 122. FIG. 3C shows a portion of a pocket 164 defined at first mating surface 144 of a platform 122. Pocket 164 may receive secondary cooling airflow of airflow path F, which flows around root 124, and is captured by pocket 164 as airflow path F flows radially outward and reaches radially inner surface 130 of platform 122, i.e., a pocket surface 168, which may be a portion of radially inner surface 130 defining the pocket 164. One or more channels 160 may extend through platform 122 from a pocket 164 defined at first mating surface 144 to a second mating surface 146, which is an opposite mating surface to first mating surface 144. In various embodiments, each channel 160 may include an inlet 166 formed in a pocket surface 168. Each channel 160 may include an outlet or cooling hole 162 formed in second mating surface 146. Channels 160 may extend completely through platform 122 of airfoil 100 in generally the circumferential direction 154. Channels 160 may be formed through platform 122 at various angles relative to the provided the xyz axes and/or the circumferential direction 154.

For example, FIG. 3A shows channels 160 may be oriented generally in the circumferential direction 154 and may also be angled in the axially aft direction (positive z-direction), for example, relative to the xz-plane. Channels 160 may be formed in different planes, such that inlets 166 of channels 160 are defined in pocket surface 168 at different radial, axial and circumferential locations, for example, relative to the yz-plane. In this regard, channels 160 may also have different lengths. Referring again to FIGS. 3B and 3C, platform 122 may define a first channel 160a having an outlet 162a formed in the second mating surface 146. First channel 160a may be formed in a first plane, relative to the x-y-z axes. Platform 122 may define a second channel 160b having an outlet 162b formed in the second mating surface 146. Second channel 160b may be formed in a second plane, relative to the x-y-z axes. The plane in which the first channel 160a is formed may be different than the plane in which the second channel 160b is formed.

FIG. 3C shows channels 160 may be angled in the axially aft direction (positive z-direction) or the axially forward direction (negative z-direction) relative to inlets 166. FIG. 3C also shows channels 160 may also be angled a the radially direction (y-direction), such as in the radially outward direction (positive y-direction) relative to inlets 166. In this regard, channels 160 may be oriented at various angles relative to inlets 166, pocket 164, second mating surface 146, and/or radially outer surface 128. Channels 160 may be parallel or non-parallel and may converge or diverge downstream toward cooling holes 162. For example, first channel 160a may be oriented in a first direction, relative to the x-y-z axes. Second channel 160b may be oriented in a second direction, relative to the x-y-z axes. The first direction may diverge from the second direction (or converge with the second direction) as the first channel 160a and second channel 160b approach second mating surface 146.

Channels 160 may direct the secondary cooling airflow of airflow path F through platform 122 and may discharge the secondary cooling airflow through cooling holes 162. Secondary cooling airflow, shown by airflow path F, flows through inlet 166 into the channels 160 within platform 122, is directed through the channel 160, and exits the channel 160 through cooling hole 162. Thus, airflow path F through platform 122 may be defined, at least in part, by the pocket 164, inlets 166, channels 160, and cooling holes 162.

With respect to circumferentially adjacent platforms 122, a second mating surface 146 of the first platform 122a faces a first mating surface 144 of the second platform 122b. As secondary cooling airflow is discharged from cooling holes 162 of first platform 122a, the secondary cooling airflow impinges the first mating surface 144 of the second platform 122b, thereby cooling the first mating surface 144 of the second platform 122b. The secondary cooling airflow flows within gap 156 as well as over radially outer surface 128 and platform trailing edge 142 of second platform 122b.

Referring to FIGS. 5A, 5B, 5C and 5D, a secondary cooling airflow for various channels 160a-160d and cooling holes 162a-162d are shown, in accordance with various embodiments. A first platform 122a is shown delivering secondary cooling airflow to a second platform 122b. First platform 122a is illustrated by second mating surface 146 and cooling holes 162a-162d and one of channels 160a-160d. Second platform 122b is disposed circumferentially adjacent to first platform 122a and is shown with first mating surface 144 facing first platform 122a.

FIG. 5A shows a first channel 160a formed in an aft end area of second mating surface 146 of first platform 122a. First channel 160a delivers a secondary cooling airflow through first platform 122a, thereby cooling first platform 122a internally. Secondary cooling airflow generally flows in a second circumferential direction 154-2 through first channel 160a and is discharged from first channel 160a through first cooling hole 162a. Secondary cooling airflow flows into gap 156 and cools first mating surface 144 of the second platform 122b as well as first mating surface 144 of the second platform 122b. A portion of secondary cooling airflow, shown by airflow path F, flows radially outward, exits gap 156 at radially outer surface 128. Secondary cooling airflow flows along radially outer surface 128 of second platform 122b to provide layer of film cooling air over radially outer surface 128. Another portion of secondary cooling airflow flows within gap 156 in an axially aft direction (positive z-direction), along first mating surface 144 and second mating surface 146. This portion of secondary cooling airflow exits gap 156 and generally flows in the second circumferential direction 154-2 along platform trailing edge 142.

FIGS. 5B, 5C and 5D respectively show a second channel 160b, a third channel 160c, and a fourth channel 160d delivering a secondary cooling airflow through first platform 122a. Second channel 160b, third channel 160c, and fourth channel 160d may be formed in the aft area 158 of second mating surface 146 of first platform 122a. Similarly to first channel 160a, each of channels 160b-160d may supply secondary cooling airflow to first mating surface 144 of the second platform 122b. Secondary cooling airflow is discharged from second channel 160b through second cooling hole 162b, from third channel 160c through third cooling hole 162c, and fourth channel 160d through fourth cooling hole 162d. Each of channels 160a-160d may supply secondary cooling airflow to the radially outer surface 128 and/or along platform trailing edge 142 of second platform 122b.

A position of channels 160a-160d and cooling holes 162a-162d may be configured to direct airflow path F according to the desired cooling flow, for example, to increase or decrease the cooling flow or to change a direction of the cooling flow over the surfaces of second platform 122b. Each of channels 160a-160d and cooling holes 162a-162d may direct cooling airflow in a different direction. For example, fourth channel 160d having the aft-most cooling hole, i.e., fourth cooling hole 162d, may deliver more cooling airflow to platform trailing edge 142 than a channel with a cooling hole located forward of fourth cooling hole 162d. The aft-most cooling hole, i.e., fourth cooling hole 162d, may deliver more cooling airflow to platform trailing edge 142 than a channel with a cooling hole located forward of fourth cooling hole 162d.

Figure 4:
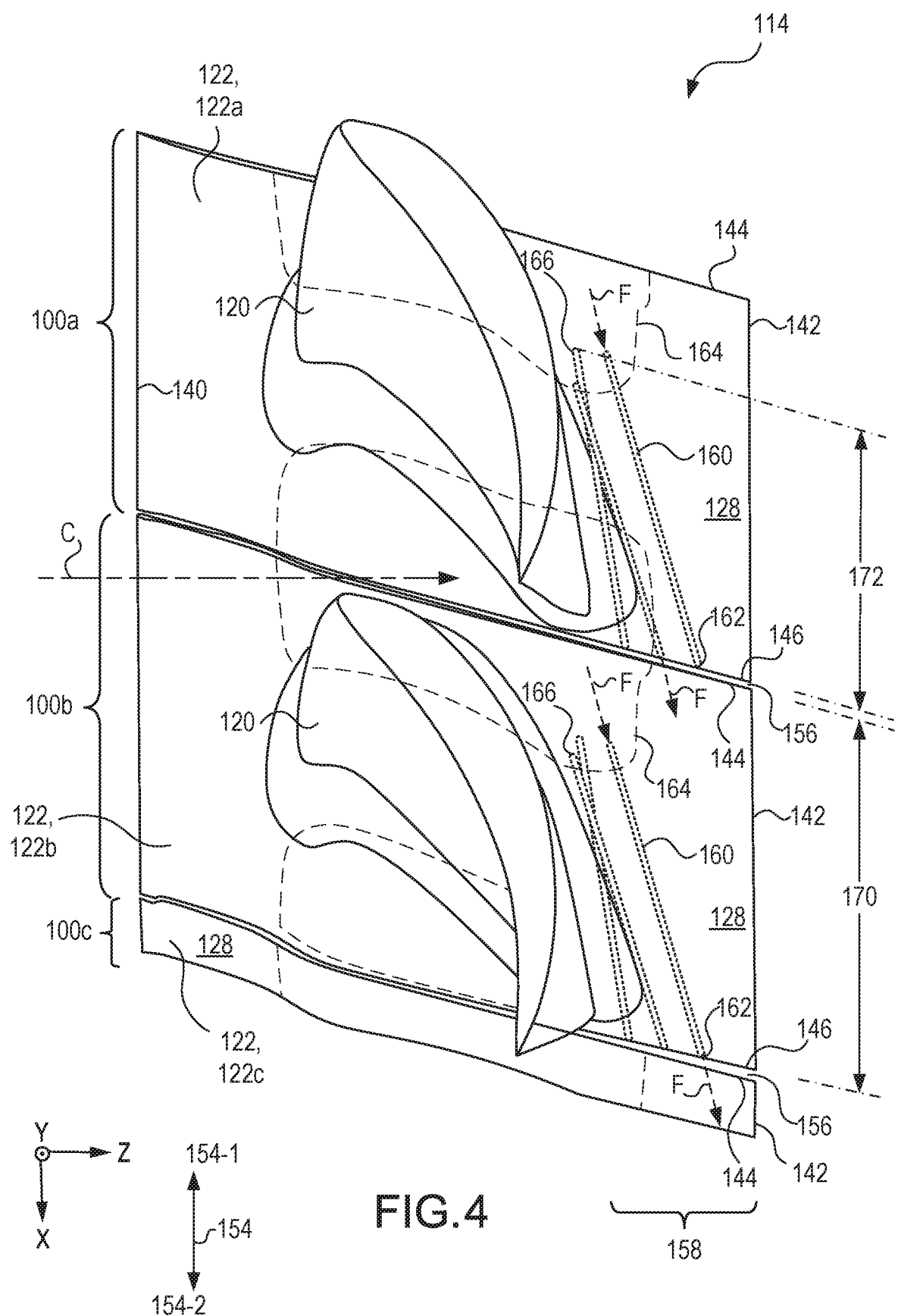
FIG. 4 illustrates a portion of a airfoil assembly having a platform cooling system, in accordance with various embodiments.

With reference to FIG. 4, a portion of an airfoil assembly 114 having a platform cooling system is shown, in accordance with various embodiments. A first blade 100a having first platform 122a, a second blade 100b having second platform 122b, and a portion of a third blade 100c having third platform 122c are illustrated as a portion of airfoil assembly 114. First blade 100a and third blade 100c are disposed at opposing circumferential sides of second blade 100b. Each of platforms 122a-122c has a first mating surface 144 at a first circumferential side (i.e., toward first circumferential direction 154-2) opposite a second mating surface 146 at a second circumferential side (i.e., toward second circumferential direction 154-1). A chord length 170 of each of platform 122a-122c may be measured between first mating surface 144 and second mating surface 146.

In various embodiments, channels 160 are formed completely through each platform 122, and may extend from pocket 164 to second mating surface 146. The channel 160 may extend at least 40% through the chord length 170 of a platform 122, or may extend at least 50% through the chord length 170, or may extend at least 60% through the chord length 170. A length of channels 160 is shown generally as length 172. As discussed above, a channel 160 may have three-dimensional aspects, not shown in FIG. 4, but shown in FIGS. 3A, 3B and 3C. A length 172 may be measured along the channel 160 between the inlet 166 and cooling hole 162 to account for angle of orientation, for example, in radial direction (y-direction). In various embodiments, the length 172 of channels 160 may be at least 40% of the chord length 170, at least 50% of chord length 170, or at least 60% of chord length 170 of platform 122. Further, as the channels 160 may have an angle of orientation in a radial direction, the length 172 of channels may be 60% of the chord length 170 or greater, or 70% of the chord length 170 or greater, or 80% of the chord length 170 or greater. As the cooling airflow of airflow path F flows internally though platforms 122, the platforms 122 are convectively cooled. A greater length of channels 160 increases the heat transfer between platforms 122 and the cooling airflow in airflow path F thereby increasing cooling effectiveness.

In various embodiments, an airfoil 100 having channels 160 formed through platform 122 may be manufactured by additive manufacturing, injection molding, electrical discharge machining (EDM), composite fabrication, machining, forging, core casting, or other suitable process. Channels 160 may be formed by subtractive techniques, drilling, milling, EDM, electrochemical machining (ECM), or other suitable process. Channel 160 may have various geometries to tailor the cooling flow through platform 122 and over mating surfaces 144, 146, platform trailing edge 142, and radially outer surface 128.

FIGS. 6A and 6B illustrate perspective views of an airfoil having a platform cooling system, in accordance with various embodiments. In the present disclosure, like reference numerals represent like features, whereas reference numerals modified by 100 are indicative of slightly modified features. An airfoil 100 has a platform 222 extending axially between a platform leading edge 140 and a platform trailing edge 142 and extending circumferentially between a first mating surface 244 and a second mating surface 246. Airfoil 200 may include a cooling system 206 that includes one or more channels 260 and one or more outlets or cooling holes 262 formed in the platform 222 of an airfoil 200.

One or more channels 260 may extend from root 224 to second mating surface 246. In various embodiments, each channel 260 may include an inlet 266 formed in a first circumferential side 225 of root 224. The first circumferential side 225 of the root 224 may be proximate the first mating surface 246 of platform 222. Each channel 260 may include an outlet or cooling hole 262 formed in second mating surface 246. Channels 260 may extend through root 224 and into platform 222 in generally the circumferential direction 154 and radial direction (y-direction). Secondary cooling airflow of airflow path F, which flows around root 124, and is captured at the first circumferential side 225 of root 224 as airflow path F flows radially outward. Airflow path F through root 224 and platform 222 may be defined, at least in part, by the root 224, inlets 266, channels 260, and cooling holes 262. As secondary cooling airflow is discharged from cooling holes 262 of platform 222, the secondary cooling airflow impinges a mating surface of an adjacent platform.

In various embodiments, channels 260 are formed completely through a portion of root 224 and platform 222, and may extend from a surface of root 224 to second mating surface 246 of platform 222. Each channel 260 may extend at least 40% through the chord length 270 of a platform 222, or may extend at least 50% through the chord length 270, or may extend at least 60% through the chord length 270. A length of channels 260 is shown generally as length 272. A length 272 may be measured along the channel 260 between the inlet 266 and cooling hole 262 to account for angle of orientation, for example, in radial direction (y-direction). In various embodiments, the length 272 of channels 260 may be at least 70% of the chord length 270, at least 80% of chord length 270, or at least 90% of chord length 270 of platform 222. Due to the angle of orientation in a radial direction, the length 272 of channels 260 may greater than the chord length 270 of platform 222. In various embodiments, the length 272 of channels 260 may be up to 150% of the chord length 270 of platform 222. As the cooling airflow of airflow path F flows internally though root 242 and platform 222, platform 222 is convectively cooled. A greater length of channels 260 increases the heat transfer between platforms 222 and the cooling airflow in airflow path F thereby increasing cooling effectiveness.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An airfoil, comprising:
   an airfoil body;
   a platform disposed radially inward of the airfoil body, the platform having a first mating surface and a second mating surface, wherein the platform includes a pocket defined by an inner diameter surface of the platform proximate the first mating surface, wherein the pocket is further defined by an axially forward wall, an axially aft wall, and a radial face extending therebetween, wherein a planar projection of a tip of the airfoil body on a plane defined by a radially outer surface of the platform lies between the axially forward wall and the axially aft wall, and wherein the planar projection of the tip of the airfoil body intersects the radial face;
   a root disposed radially inward of the platform and comprising a fir-tree coupling; and
   a first channel defined in the platform and extending linearly therethrough between a first inlet and a first outlet, wherein the first outlet of the first channel is defined in the second mating surface, wherein the first inlet is defined in the radial face of the pocket, and
   a second channel defined in the platform and extending into the fir-tree coupling linearly between a second inlet and a second outlet, wherein the second outlet of the second channel is defined in the second mating surface, wherein the second inlet is defined in a rib of the fir-tree coupling.

2. The airfoil of claim 1, wherein the first channel extends at least 50% through a chord length of the platform.

3. The airfoil of claim 1, wherein the first channel and the second channel are configured to direct a cooling airflow from a first circumferential side of the airfoil, internally through the platform, and to the second mating surface of the platform at a second circumferential side of the airfoil, wherein the second circumferential side of the airfoil is opposite to the first circumferential side of the airfoil.

4. The airfoil of claim 1, further comprising a third channel defined in the platform and the root, extending linearly therethrough, between a third inlet and a third outlet, wherein the third inlet is defined in a first circumferential side of the root, wherein the third outlet of the second channel is defined in the second mating surface, wherein the first channel is oriented in a first direction and the third channel is oriented in a second direction, and wherein the first direction diverges from the second direction as the first channel and the third channel approach the second mating surface.

5. The airfoil of claim 1, wherein the airfoil comprises a blade.

6. An airfoil assembly, comprising:
   a first airfoil having a first platform and a root having a fir-tree coupling disposed radially inward of the first platform, the first platform having a first mating surface and a second mating surface, wherein the first platform defines a first channel extending linearly therethrough between a first inlet and a first outlet, wherein the first outlet is formed in the second mating surface and wherein the first inlet is defined in a radial face of the a pocket of the first platform, wherein the pocket is defined by an axially forward wall, an axially aft wall, and a radial face extending therebetween, wherein a planar projection of a tip of the first airfoil on a plane defined by a radially outer surface of the platform lies between the axially forward wall and the axially aft wall, and wherein the planar projection of the tip of the first airfoil intersects the radial face,
   a second channel defined in the first platform and extending into the fir-tree coupling linearly between a second inlet and a second outlet, wherein the second outlet of the second channel is defined in the second mating surface, wherein the second inlet is defined in a rib of the fir-tree coupling; and
   a second airfoil adjacent to the first airfoil, the second airfoil having a second platform with a first mating surface and a second mating surface, wherein each of the first channel and the second channel in the first airfoil are configured to deliver a cooling airflow to the first mating surface of the second airfoil.

7. The airfoil assembly of claim 6, wherein the pocket is defined by an inner diameter surface of the first platform proximate the first mating surface of the first platform.

8. The airfoil assembly of claim 7, wherein the first channel extends at least 50% through a chord length of the first platform.

9. The airfoil assembly of claim 7, wherein the first outlet is formed in an aft area of the second mating surface of the first platform, and wherein the first channel is further configured to deliver the cooling airflow to a platform trailing edge of the second platform.

10. The airfoil assembly of claim 6, wherein the second inlet of the second channel is defined in a first circumferential side of the fir-tree coupling of the root proximate the first mating surface of the first airfoil.

11. The airfoil assembly of claim 10, wherein a length of the first channel is at least 80% of a chord length of the first platform.

12. The airfoil assembly of claim 10, wherein the cooling airflow is received by the first airfoil from an airflow path external to the root.

13. The airfoil assembly of claim 6, wherein the first platform and the root define a third channel extending linearly therethrough between a third inlet and a third outlet, wherein the third inlet is defined in a first circumferential side of the root, wherein the third outlet is defined in the second mating surface of the first platform, and wherein the first channel is formed in a plane which is different than a plane in which the third channel is formed.

14. A gas turbine engine, comprising:
   a compressor section configured to supply a cooling airflow; and
   a turbine section comprising:
      a disk configured to rotate about an axis, and
      a blade coupled to the disk, the blade comprising:
         an airfoil body,
         a platform disposed radially inward of the airfoil body, the platform including a pocket and having a first mating surface and a second mating surface, wherein the pocket is further defined by an axially forward wall, an axially aft wall, and a radial face extending therebetween, wherein a planar projection of a tip of the airfoil body on a plane defined by a radially outer surface of the platform lies between the axially forward wall and the axially aft wall, and wherein the planar projection of the tip of the airfoil body intersects the radial face, the platform configured to receive the cooling airflow proximate the first mating surface, a root disposed radially inward of the platform having a fir-tree coupling, a first channel defined in the platform and extending linearly therethrough between a first inlet and a first outlet, wherein the first outlet of the first channel is defined in the second mating surface, wherein the first inlet is defined in a radial face of the pocket, and a second channel defined in the platform and extending into the fir-tree coupling linearly between a second inlet and a second outlet, wherein the second outlet of the second channel is defined in the second mating surface, wherein the second inlet is defined in a rib of the fir-tree coupling.

15. The gas turbine engine of claim 14, wherein the pocket is defined by an inner diameter surface of the platform proximate the first mating surface, and wherein the second inlet of the second channel is defined in a first circumferential side of the fir-tree coupling of the root.

16. The gas turbine engine of claim 15, wherein the second channel extends at least 50% through a chord length of the platform.

17. The gas turbine engine of claim 14, wherein the blade further comprises a third channel defined in the platform and the root, extending linearly therethrough, between a third inlet and a third outlet, wherein the third inlet is defined in a first circumferential side of the root, wherein the third outlet of the third channel is defined in the second mating surface.

18. The gas turbine engine of claim 17, wherein a length of the first channel and the third channel are each at least 80% of a chord length of the platform.

* * * * *